Figure 1:
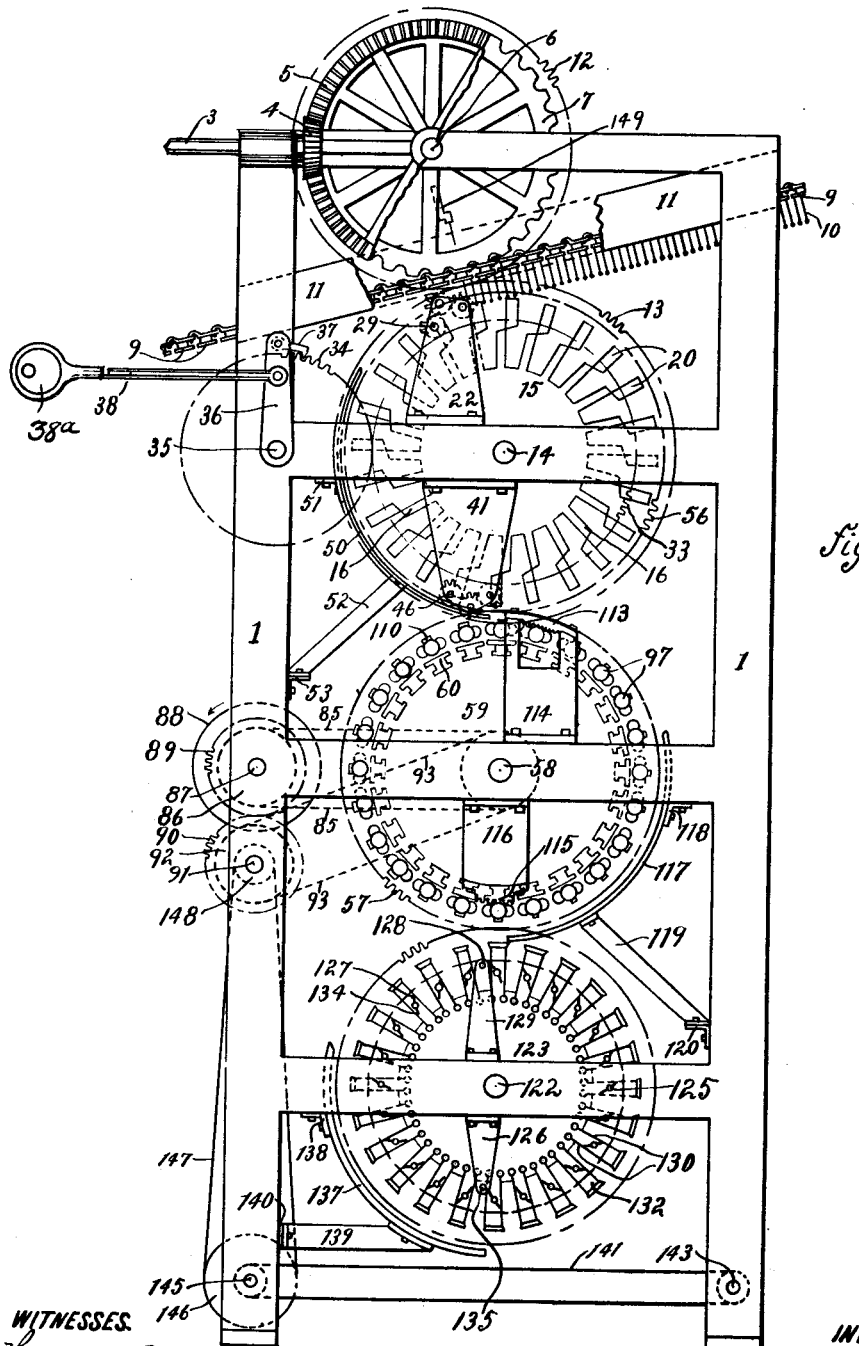

F. SCHAFER.
MATCH BOX FILLING MACHINE.
APPLICATION FILED NOV. 6, 1909.

1,034,308.

Patented July 30, 1912.

15 SHEETS—SHEET 1.

WITNESSES.

INVENTOR.

Frank Schafer.

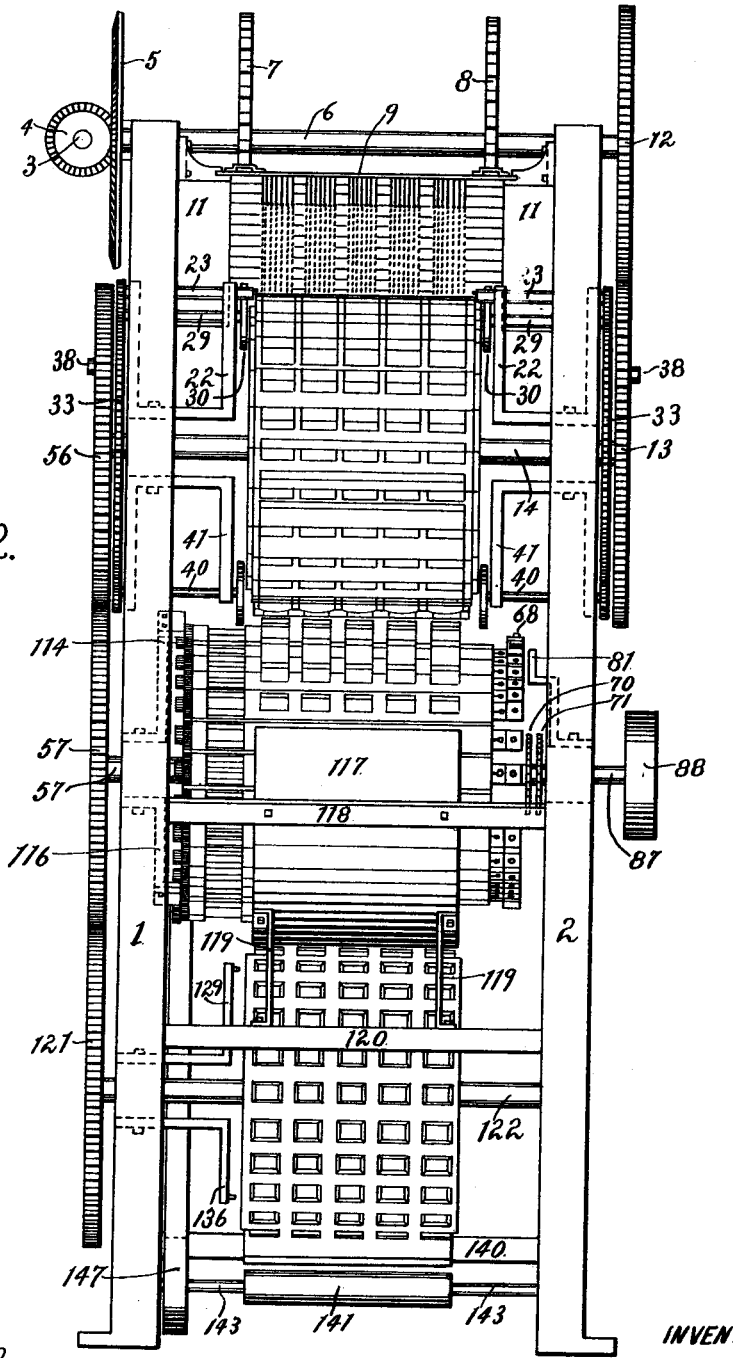

F. SCHAFER.
MATCH BOX FILLING MACHINE.
APPLICATION FILED NOV. 6, 1909.
1,034,308.
Patented July 30, 1912.
15 SHEETS—SHEET 3.
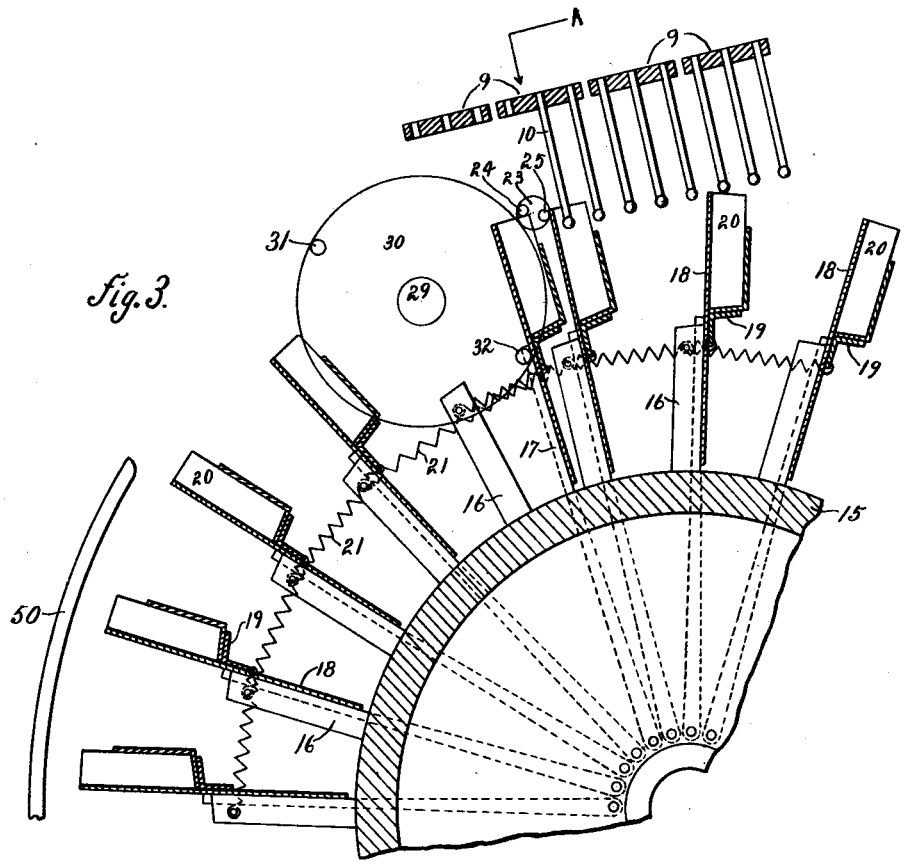
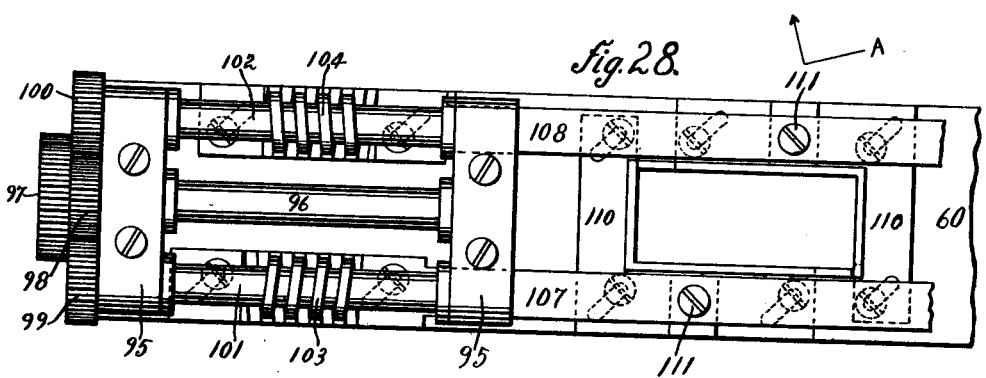
WITNESSES.
Henry Boehm
Carrie E. Schafer
INVENTOR.
Frank Schafer.

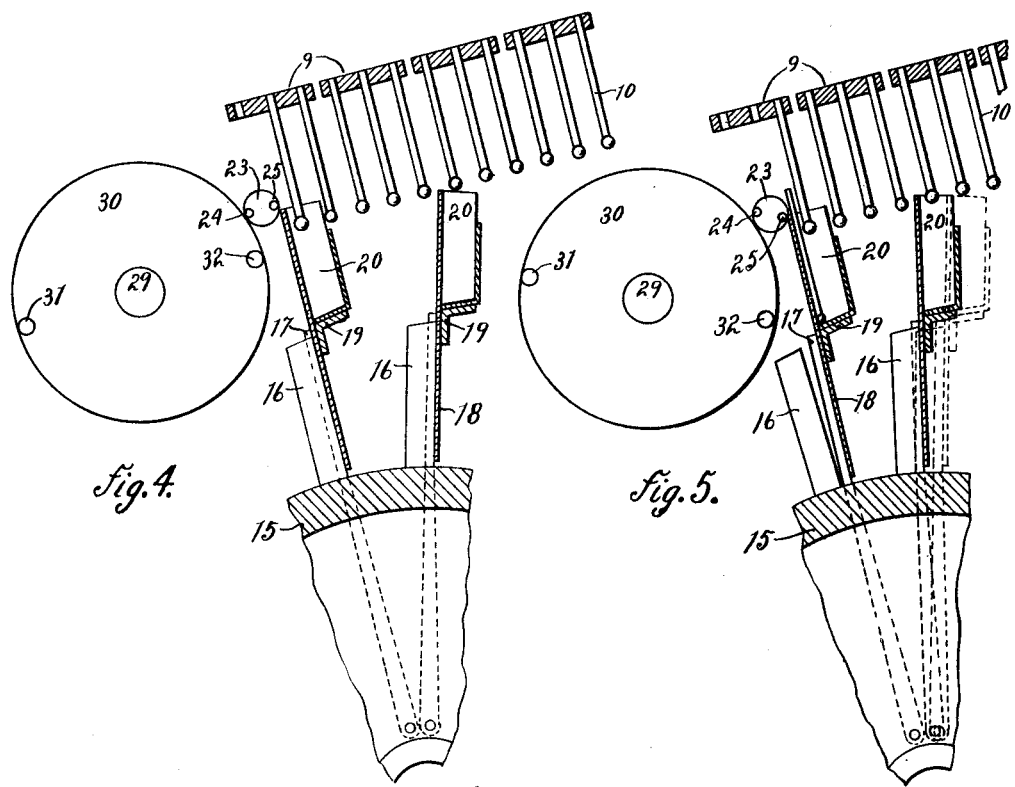
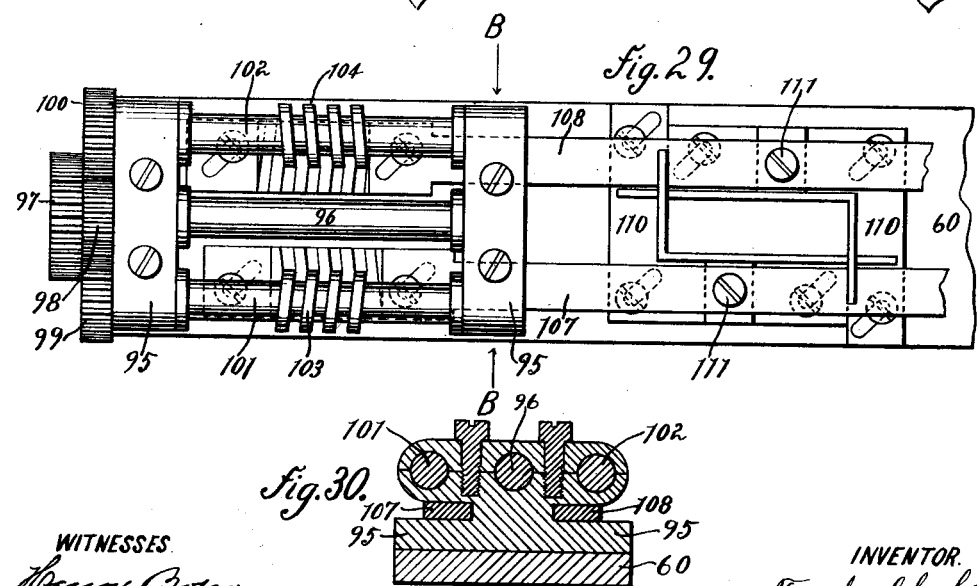

F. SCHAFER.
MATCH BOX FILLING MACHINE.
APPLICATION FILED NOV. 6, 1909.
1,034,308.
Patented July 30, 1912.
15 SHEETS—SHEET 5.
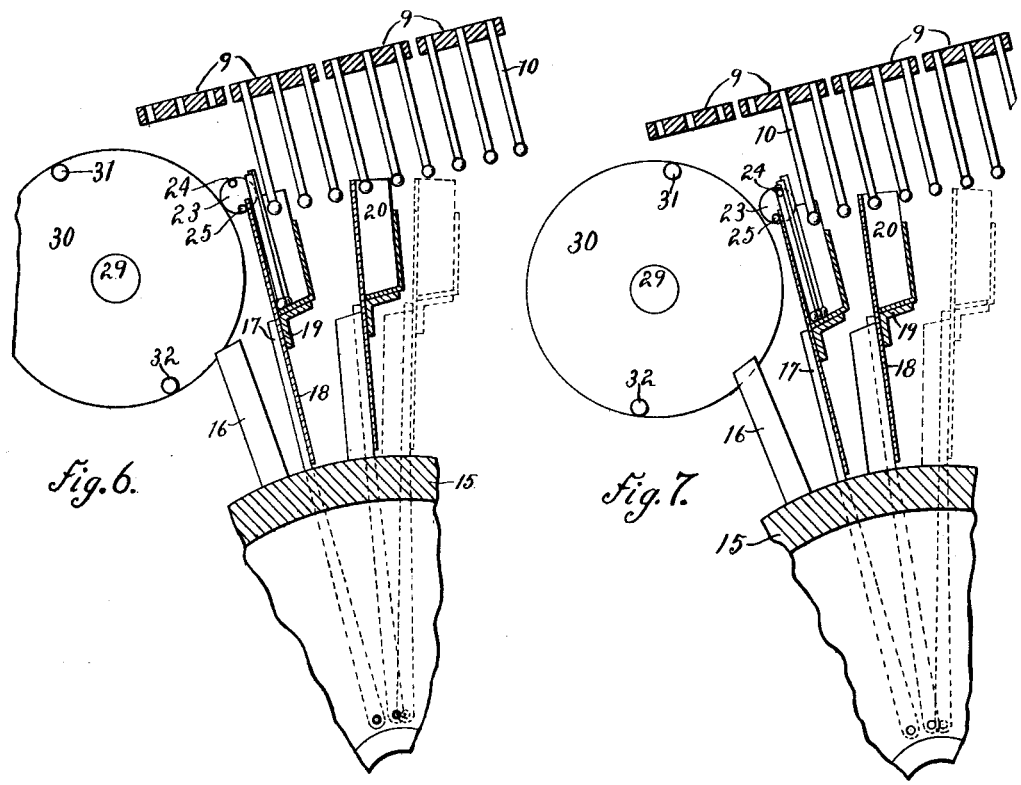
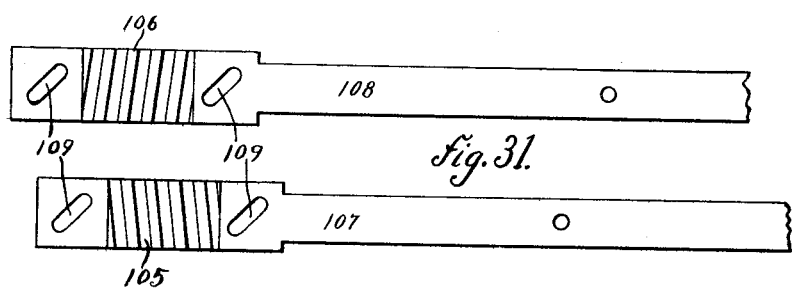
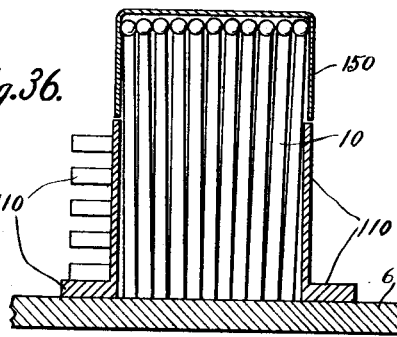
WITNESSES.
INVENTOR.
Frank Schafer.

F. SCHAFER.
MATCH BOX FILLING MACHINE.
APPLICATION FILED NOV. 6, 1909.
1,034,308.
Patented July 30, 1912.
15 SHEETS—SHEET 6.
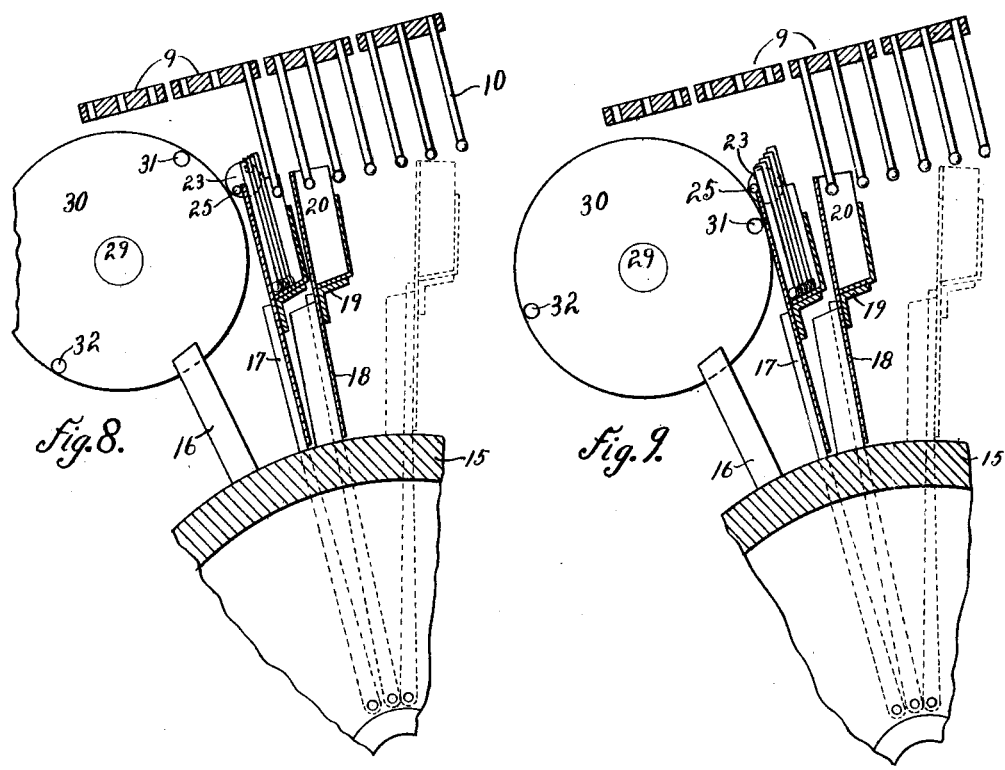
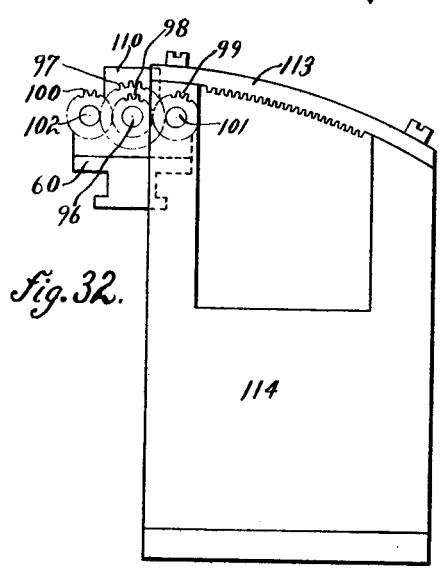
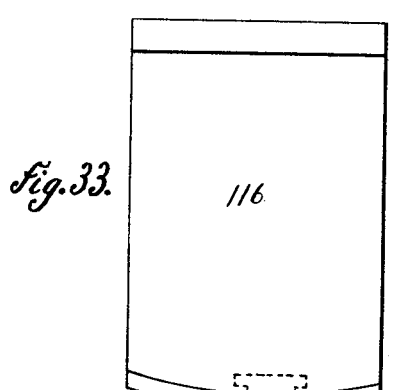
WITNESSES.
Henry Bom
Carrie E. Schafer.
INVENTOR.
Frank Schafer.

F. SCHAFER.
MATCH BOX FILLING MACHINE.
APPLICATION FILED NOV. 6, 1909.
1,034,308.
Patented July 30, 1912.
15 SHEETS—SHEET 7.
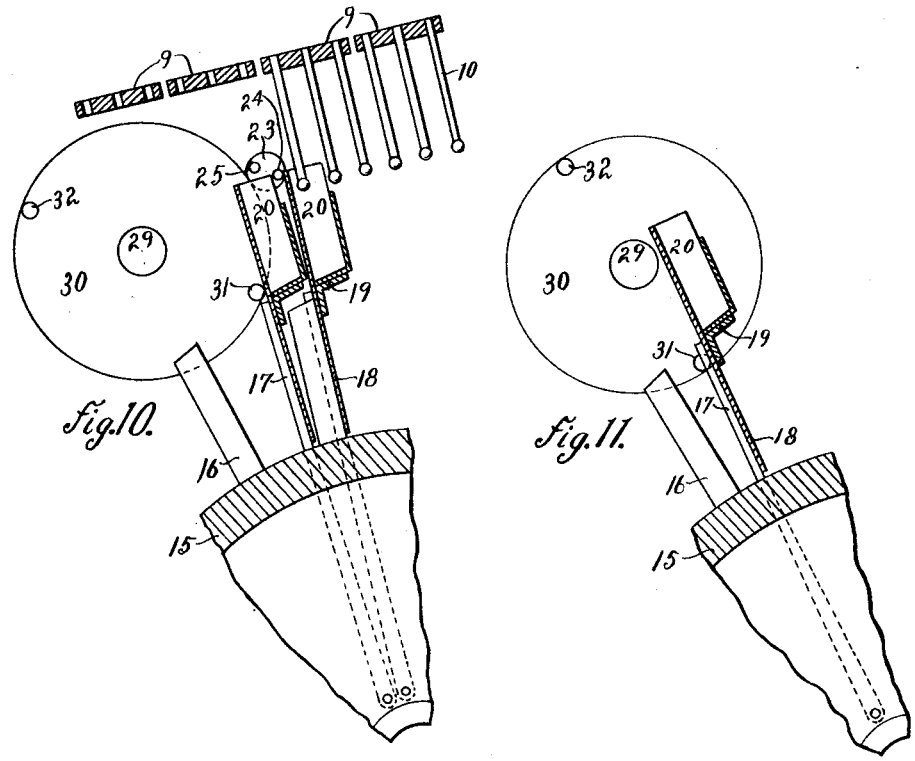
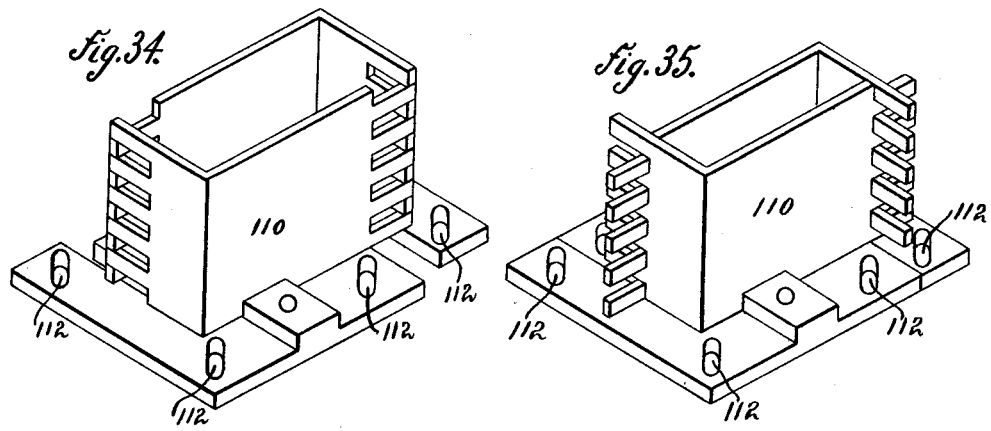
WITNESSES.
Henry Bohn
Carrie E. Schafer.
INVENTOR.
Frank Schafer.

F. SCHAFER.
MATCH BOX FILLING MACHINE.
APPLICATION FILED NOV. 6, 1909.

1,034,308.

Patented July 30, 1912.
15 SHEETS—SHEET 8.

WITNESSES.
Henry Bow
Carrie E. Schafer

INVENTOR.
Frank Schafer.

F. SCHAFER.
MATCH BOX FILLING MACHINE.
APPLICATION FILED NOV. 6, 1909.
1,034,308.
Patented July 30, 1912.
15 SHEETS—SHEET 9.
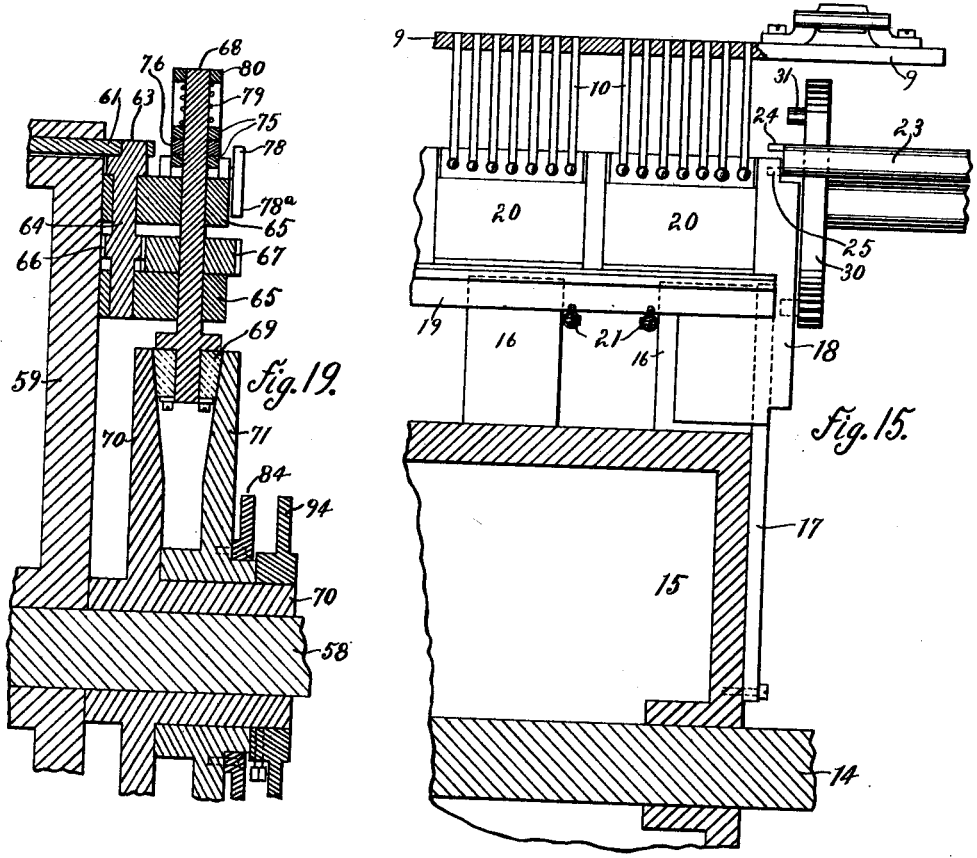
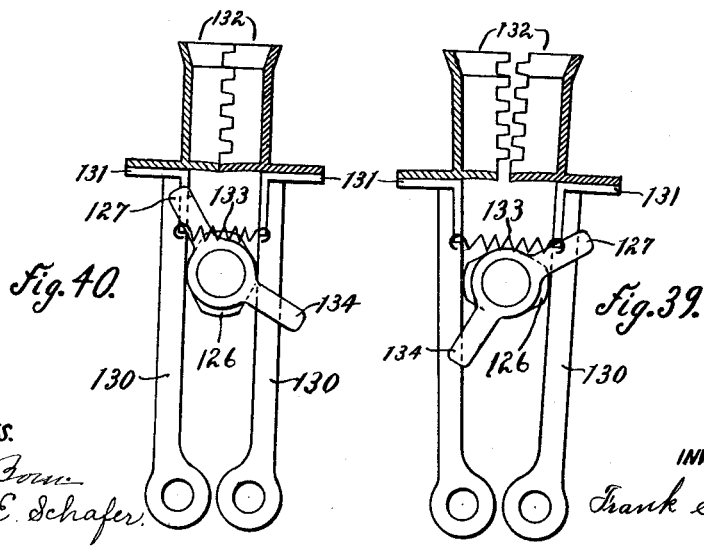
WITNESSES.
INVENTOR.
Frank Schafer.

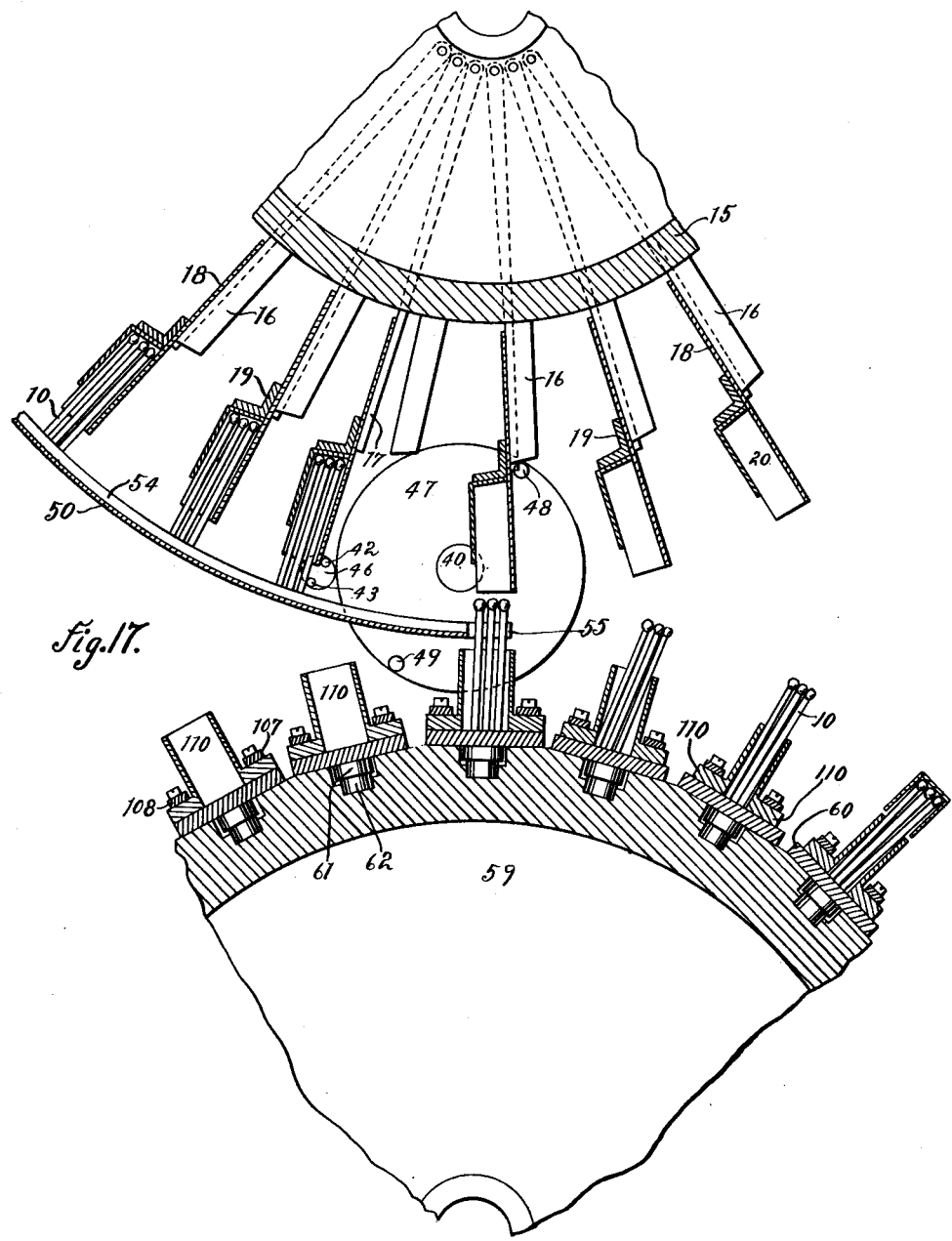

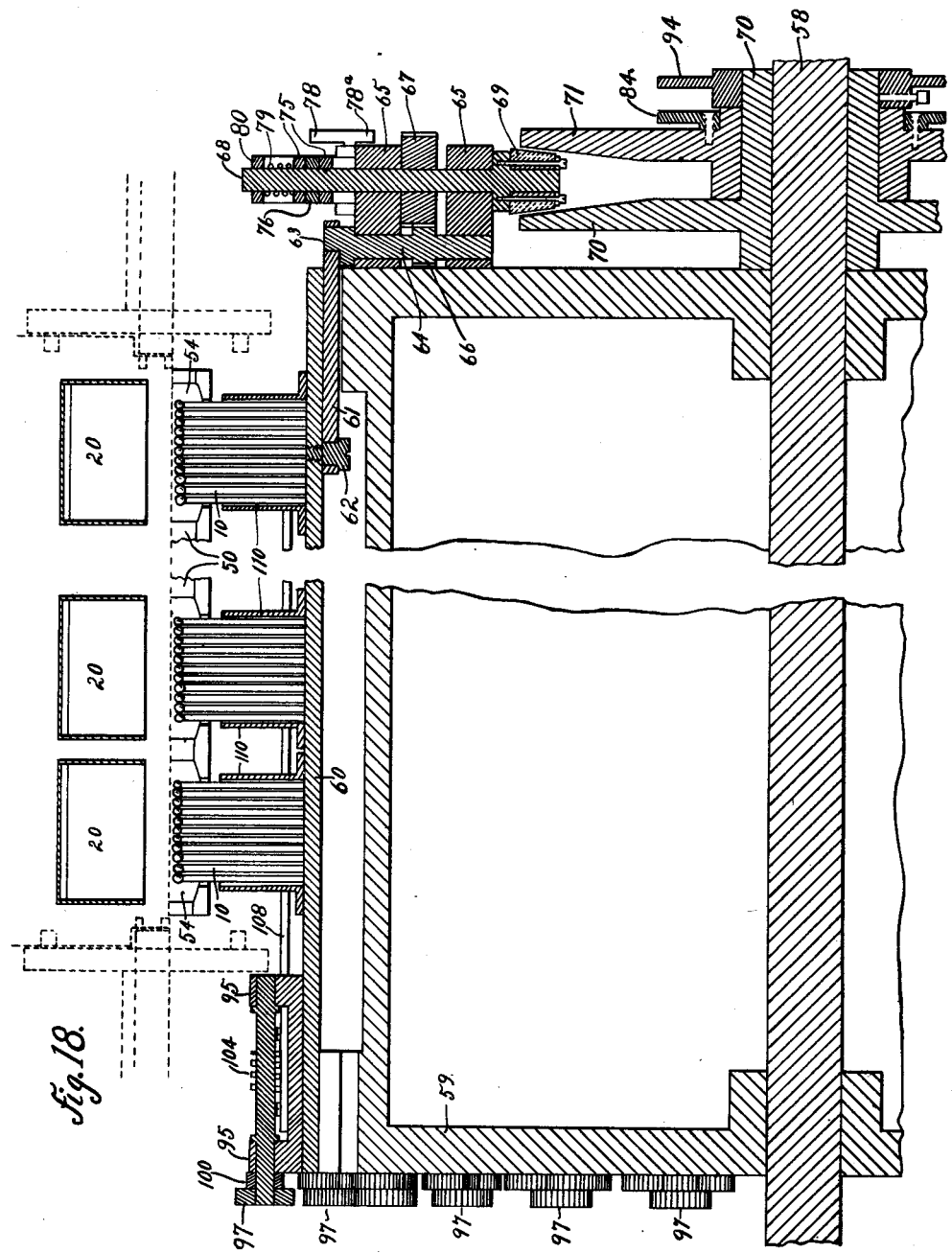

F. SCHAFER.
MATCH BOX FILLING MACHINE.
APPLICATION FILED NOV. 6, 1909.
1,034,308.
Patented July 30, 1912.
15 SHEETS—SHEET 12.
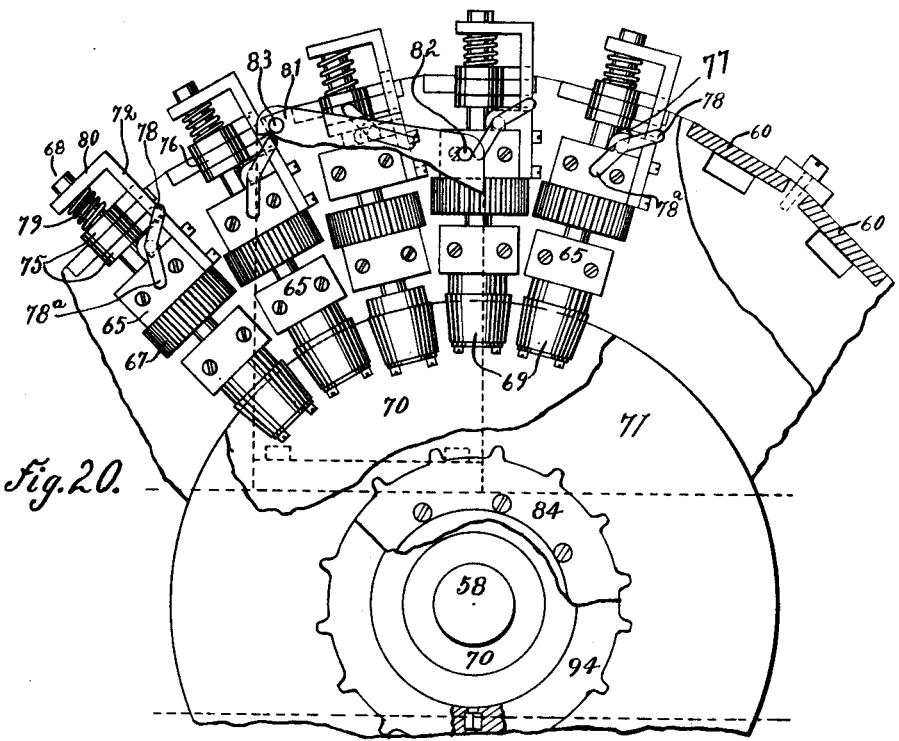
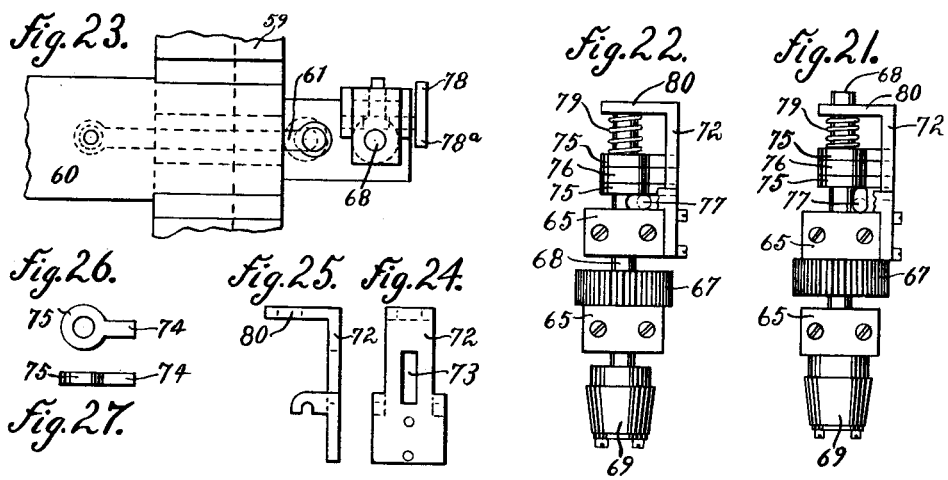
WITNESSES.
INVENTOR.
Frank Schafer.

F. SCHAFER.
MATCH BOX FILLING MACHINE.
APPLICATION FILED NOV. 6, 1909.

1,034,308.

Patented July 30, 1912.
15 SHEETS—SHEET 13.

WITNESSES.

INVENTOR.
Frank Schafer.

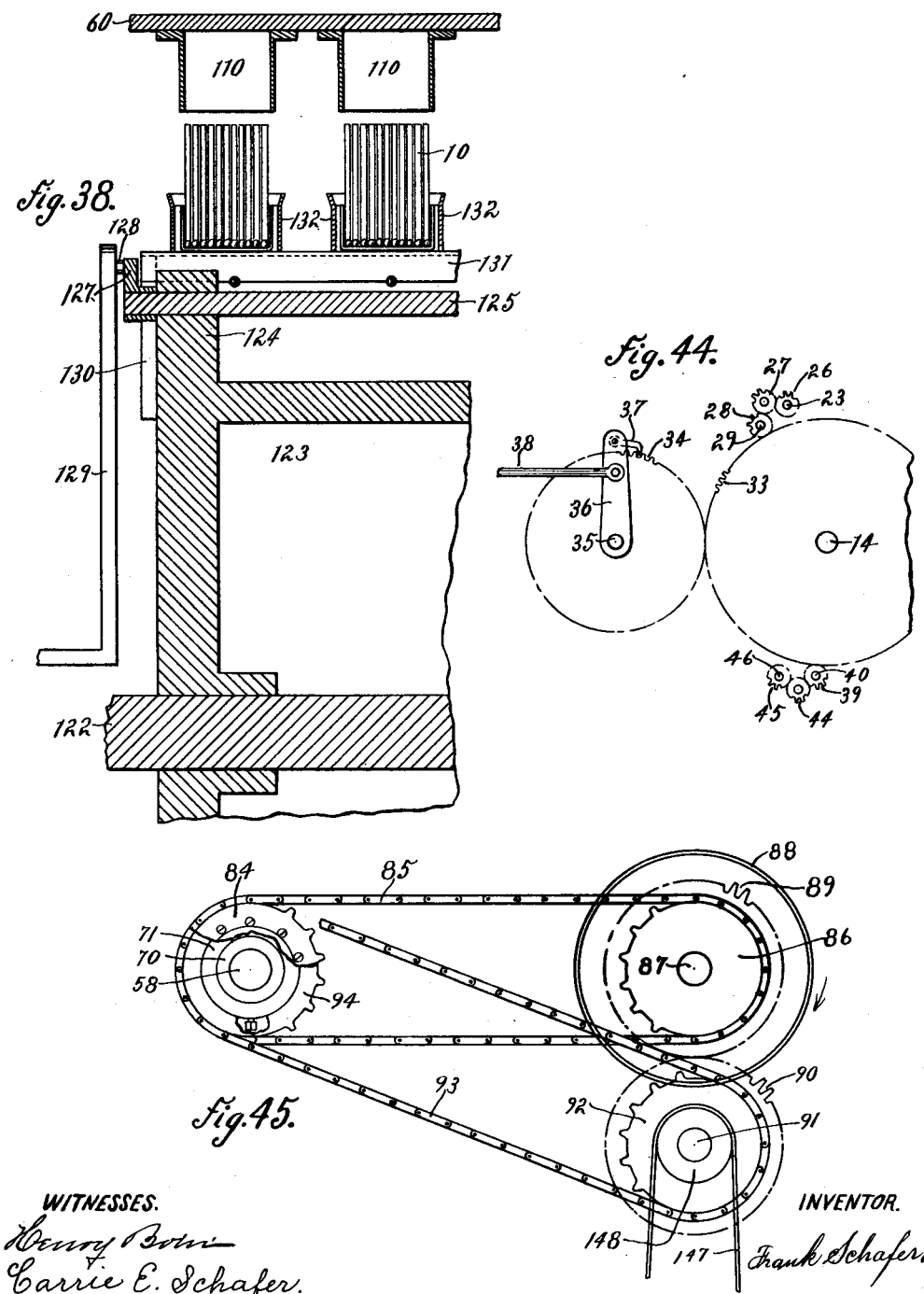

F. SCHAFER.
MATCH BOX FILLING MACHINE.
APPLICATION FILED NOV. 6, 1909.
1,034,308.
Patented July 30, 1912.
15 SHEETS—SHEET 15.
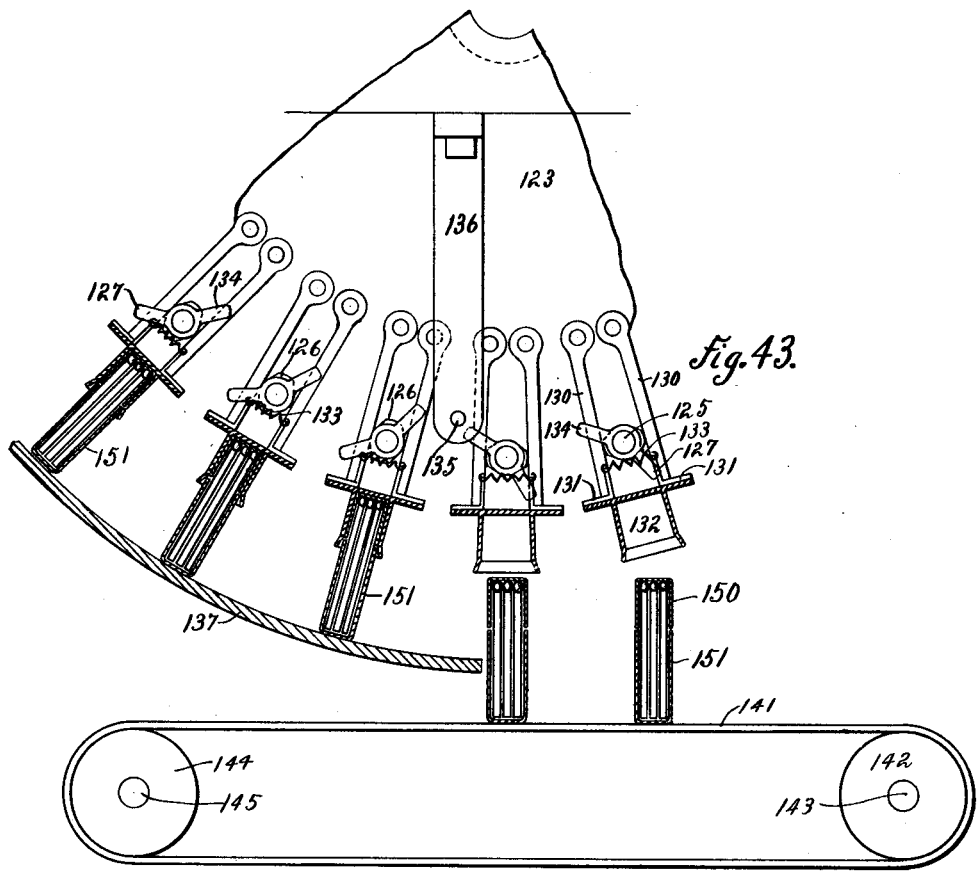
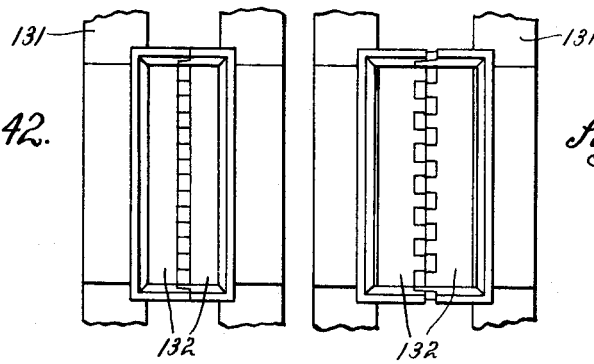
WITNESSES
INVENTOR.

UNITED STATES PATENT OFFICE.

FRANK SCHAFER, OF PHILADELPHIA, PENNSYLVANIA.

MATCH-BOX-FILLING MACHINE.

1,034,308. Specification of Letters Patent. Patented July 30, 1912.

Application filed November 6, 1909. Serial No. 526,654.

*To all whom it may concern:*

Be it known that I, FRANK SCHAFER, a citizen of the United States, residing in the city and county of Philadelphia, State of Pennsylvania, have invented a certain new and useful Improvement in Match-Box-Filling Machines, which improvement is fully set forth in the following specification and accompanying drawings.

My invention relates to improvements in match box filling machines and more particularly for filling matches in boxes such as are given away with purchases of tobacco and the like; in which the boxes are similar in construction and are slid lengthwise over the matches, the two halves forming a perfect box or covering for the matches.

It consists of means whereby an endless match carrier is caused to move in an inclined guideway situated above a drum. This rotates with a step by step movement which corresponds with that of the endless carrier and around the circumference of which is arranged a series of pivoted boxes into which the matches are ejected.

It also consists of means whereby the pivoted boxes are retarded in their movement while a certain number of matches are ejected therein, after which the movement of the box is accelerated until it again corresponds with the fixed step by step rotation of the drum.

It also consists of means whereby the pivoted boxes are a second time retarded in their movement and then again accelerated so that the entire box of matches will fall at one time into the expanded sectional box of a second drum situated directly underneath the first drum.

It also consists of means whereby the expanded sectional box is caused to vibrate rapidly and then contract thus bringing the matches into the smallest space possible so that a cover or one half of a box can be placed over the heads of the matches.

It also consists of means whereby the sectional box is caused to expand again and drop the box of matches into the opened split boxes of a third drum situated directly underneath the second drum.

It also consists of means whereby the open split box of the third drum is caused to close on the covered end of the matches, so that the other half of the cover or box can be put on, and at a certain place is opened, allowing the completely covered matches to fall onto a belt which carries them to the operator to wrap them into suitable packages for shipping.

It also consists of details of construction all as will be hereinafter set forth.

Figure 16:
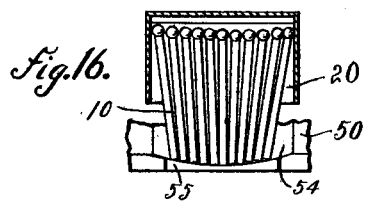
Figure 37:
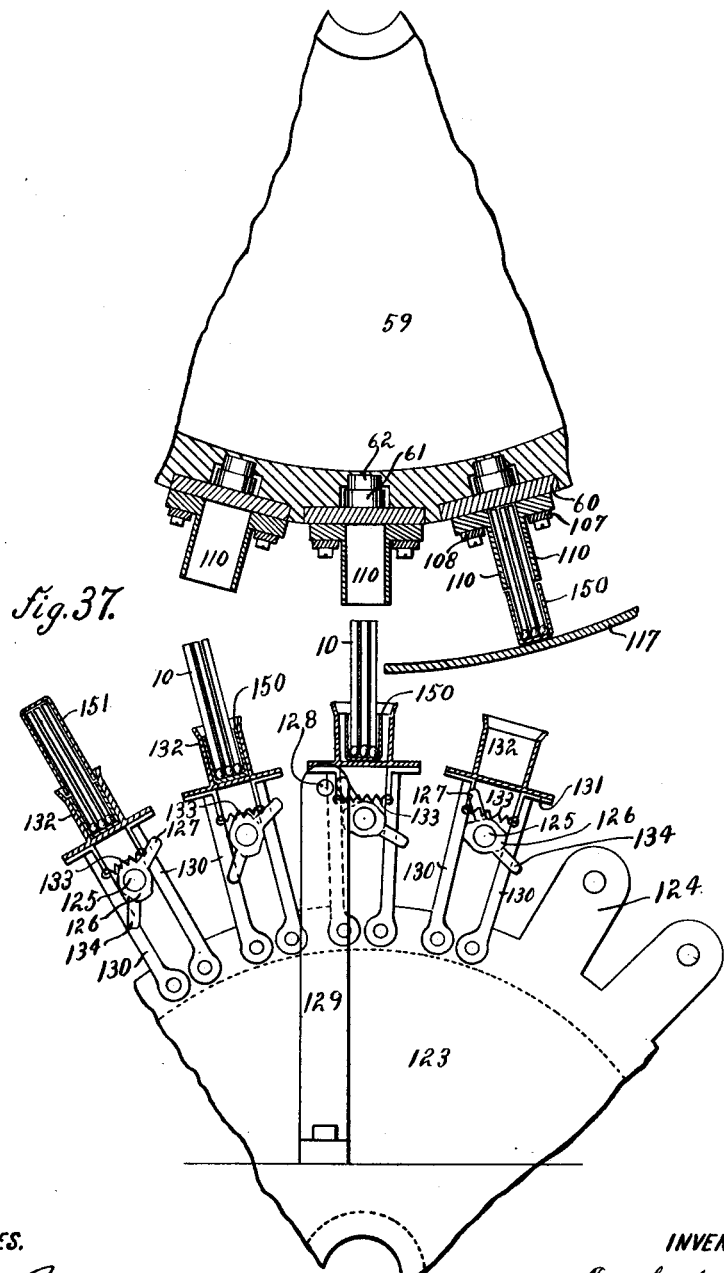

Figure 1 represents a side elevation of a machine embodying my invention and Fig. 2 an end view thereof. Fig. 3 represents an enlarged view, partly sectional, of the carrier, the matches, and the first drum with the pivoted boxes. Figs. 4, 5, 6, 7, 8 and 9 represent enlarged views, partly sectional, of the carrier, the matches, pivoted boxes and the shaft 23 having the diametrically opposite pins 25 and 24 which retard the regular movement of the pivoted boxes during the time the matches are ejected therein. Figs. 10, 11, 12, 13 and 14 represent enlarged views, partly sectional, of the pivoted boxes and the disk 30 having the diametrically opposite pins 31 and 32 which permit the accelerated movement of the pivoted boxes until the same are moving again in unison with the step by step rotation of the drum 15. Fig. 15 is a sectional view on lines A—A of Fig. 3. Fig. 16 represents a view showing the position of the matches in the pivoted boxes 20 and in the curved groove 54 of the guard plate 50, just previous to dropping from this guard plate into the expanded sectional boxes. Fig. 17 represents a sectional view showing the matches falling from the boxes of the top drum into the expanded sectional boxes of the second drum. Fig. 18 is a sectional view through the center of Fig. 17, and in which is also shown the mechanism for vibrating the sectional boxes. In this view the friction wheel 69 is in its raised or inactive position. Fig. 19 is a sectional view showing the mechanism for vibrating the sectional boxes with the friction wheel 69 in its lower or active position. Fig. 20 represents a side elevation of the mechanism for vibrating the sectional boxes. Fig. 21 represents a view showing the cam which raises the shaft 68 and friction wheel 69 and which renders the vibrating mechanism inactive. Fig. 22 represents a view of Fig. 21 showing the cam after it has been given a quarter turn and lowering the shaft 68 and friction wheel 69 and which renders the vibrating mechanism active. Fig. 23 is a plan view showing the vibrating bar, the eccentric rod, eccentric and bracket supporting shaft 68. Fig. 24 shows the bracket for supporting the top end of the shaft 68 and also the slot in which slides the end of the friction washer 74. Fig. 25 is a side view of Fig. 24 and shows the bearing for the cam 77. Fig. 26 is a plan view of the friction washer and Fig. 27 a side view thereof. Fig. 28 is a plan view of the vibrating plate 60 and the mechanism for expanding and contracting the sectional boxes. In this view the box 110 is expanded. Fig. 29 is a view showing the box 110 contracted. Fig. 30 is a sectional view on lines B—B of Fig. 29. Fig. 31 is a plan view of the rack bars in which the square thread of the shaft meshes and which are pivoted to the expanding and contracting boxes 110. Fig. 32 is a view showing the curved rack which rotates the gear 97 in the proper direction to contract the boxes 110. Fig. 33 is a view showing the curved rack which reverses the rotation of the gear 97 and expands the box 110. Fig. 34 is a perspectvie view showing the boxes 110 in its expanded and Fig. 35 in its contracted form. Fig. 36 is a sectional view, full size, showing the sectional box with the matches therein and a cover or box over the heads of the matches. Fig. 37 is a sectional view showing the box of matches with one box or cover on, falling from the second drum onto the third drum. Fig. 38 is a sectional view through the center of Fig. 37. Fig. 39 is an enlarged view showing the cam 126 which opens the split boxes of the third drum and Fig. 40 shows the cam after it has been rotated or turned a one quarter revolution thus permitting the springs 133 to close the box. Fig. 41 is a plan view showing the split boxes open and Fig. 42 shows them closed. Fig. 43 is a sectional view showing the completely covered box of matches falling from the third drum onto the belt 141. Fig. 44 shows the intermittent drive and gearing for the speed retarding and accelerating wheels of the top drum. Fig. 45 represents a view of the gearing and chains to drive the oppositely rotating friction wheels 70 and 71 and pulley 148 partly around which passes the belt 147.

Similar characters of reference indicate corresponding parts in the various figures.

Referring to the drawings: 1 designates the left hand and 2 the right hand frame of the machine, 3 designates the driving shaft which is journaled in a suitable bearing on the frame 1. The frames 1 and 2 can be part of the frame of a continuous match machine which cuts or feeds splints into an endless carrier or secured thereto, but in either case the shaft may be a continuation of the shaft driving the mechanism of the feeding of the endless carrier or it may be intergeared with same, so that the movement of this machine is in timed relation with the aforesaid continuous machine.

4 designates a small bevel gear secured to shaft 3 which meshes with another large bevel gear 5 secured to shaft 6 journaled in the frames 1 and 2. Also secured to the shaft 6 are the sprocket gears 7 and 8 which mesh in the connecting links of the endless carrier which consist of the plates 9 each of which has three rows of holes in which the match splints 10 are forced and are held by compressing the end of the splint. The plates 9 are caused to move in suitable guideways 11 which are bolted to the inside of the frames 1 and 2. (See Figs. 1 and 2.) Said guideways are situated at an angle to the horizontal to cause the matches to slide into the boxes and not scatter or fall in all directions. Also secured to the end of the shaft 6 is the gear 12 meshing with gear 13 secured to shaft 14 journaled in the frames 1 and 2. Also secured to shaft 14 is the drum 15 having the extending arms 16 and to the sides of the drum are pivoted the arms 17 to the swinging ends of which is secured the plate 18 which extends across said drum 15 and between the extending arms 16. Also secured to the plate 18 and extending across it is the angle iron 19 to the top of which is secured the pivoted box 20. (See Figs. 3 to 13 inclusive.) The parts numbered 17, 18, 19 and 20 will be referred to as the pivoted box 20 unless otherwise specified and the normal position of which is against the extending arm 16 and is held there by the springs 21 which are hooked through a suitable hole in the angle iron 19 and the other end hooked to a screw in the outer end of the preceding end of the extending arm 16. (See Fig. 3.)

22 designates brackets secured to the frames 1 and 2 in which are journaled shafts 23 and on the inner ends of which are the diametrically opposite pins 24 and 25. To the shafts 23 are also secured the gears 26 meshing with idler gears 27 rotating on stud bolts secured to the brackets 22. The idler gears also mesh with gears 28 secured to shafts 29 journaled in brackets 22. (See Figs. 1 and 44). To the shafts 29 are also secured disks 30 having the diametrically opposite pins 31 and 32 and which permit the accelerated movement of the pivoted boxes. The gears 26 mesh with gears 33 loosely mounted on shaft 14 and the latter gears mesh with gears 34 secured to shaft 35 journaled in the frames 1 and 2. (See Figs. 1, 2 and 44.) An intermittent motion is imparted to gear 34 by means of the swinging arm 36 which is loosely mounted on the shaft 35 and to the swinging end of which is loosely pivoted the ratchet dog 37, the free end of which engages with the teeth of the gear 34. Pivoted to the side of the swinging arm 36 is one end of the connecting rod 38 the other end of which is oscillated by any suitable means as for instance an eccentric 38ª secured to any shaft which rotates in timed unison with the feed of the chain plates, also meshing with the gear 33 is the small gear 39 secured to shaft 40 journaled in the bracket 41 secured to the frames 1 and 2. On the inner end of the shaft 40 are the diametrically opposite pins 42 and 43 and the purpose of which will be hereinafter explained. Also meshing with the small gear 39 is the idler gear 44 which rotates on a suitable bolt screwed into the bracket 41, meshing with the idler 44 is gear 45 secured to shaft 46 which is also journaled in the bracket 41 and to the other end of this shaft is secured a disk 47 having the diametrically opposite pins 48 and 49 and the purpose of which will be hereinafter explained. (See Figs. 1, 2 and 44.)

50 designates a circular guard plate which extends partly around the outer surface of the drum 15 and is held in place at the top by the angle iron 51 and at the bottom by the bracket 52 secured to the angle iron 53, secured to the frames 1 and 2. (See Fig. 1.) The circular plate 50 has a curved depression 54 on its inner side in line with the pivoted box 20 and at the end of said curved depression is a recess 55 which guides the matches as they fall into the expanded boxes 110 as seen in Fig. 18. Secured to shaft 58 is the drum 59 and on the periphery of which are guideways running parallel with the shaft 58 in which slides a plate 60 vibrated by means of the connecting rod 61 pivoted on the screw 62 oscillated by the eccentric 63 of the shaft 64 which runs in the bearings 65 secured to the side of the drum 59. (See Fig. 18.)

66 designates the gear of the shaft 64 which meshes with the gear 67 secured to a sliding shaft 68. One end of this shaft has a bevel friction wheel 69 screwed to its end pointing to the center of the drum 59 and at predetermined places contact with the oppositely rotating friction wheels 70 and 71. The inner friction wheel 70 is loosely mounted on the shaft 58 and is free to rotate thereon in any direction. The other friction wheel 71 is loosely mounted on the hub of the wheel 70 and is free to rotate in a direction opposite to that of 70 and the purpose of which will be hereinafter explained. (See Figs. 18, 19 and 20.)

72 designates a small bracket screwed to the sides of the upper one of the bearings 65 and in which is a slot 73 in which slides the end 74 of a friction washer 75 and prevents it from rotating. It will be seen that there are two of these washers, one on each side of a collar 76 which is pinned to the shaft 68 and rotates therewith, between the lower washer 75 and the bearing 65 is a cam 77 which raises and lowers the shaft 68 when it is given a quarter turn by arms 78 and 78ª striking against pins 82 and 83 extending out from the bracket 81 secured to the frame 2 and the purpose of which will be hereinafter explained. (See Figs. 2, 20, 21 and 22.)

79 designates a spring which is loosely mounted on the shaft 68 between the top friction washer 75 and the angle part 80 of the bracket 72 and which presses the shaft 68 downward when allowed to do so by the cam 77 and the purpose of which will be hereinafter explained. (See Figs. 18, 19, 20 to 27 inclusive.)

84 designates a sprocket wheel which is screwed to the side of the friction wheel 71 and around which passes the chain 85 which also passes around sprocket 86 secured to shaft 87 journaled in the frames 1 and 2. Secured to shaft 87 is the belt wheel 88 which can be driven from any suitable source. Also secured to shaft 87 is the gear wheel 89 which meshes with the gear 90 secured to shaft 91 journaled in the frames 1 and 2. Secured to the shaft 91 is the sprocket 92 around which passes the chain 93 also passing around the sprocket 94 secured to the friction wheel 70 and which rotates this in a direction opposite to the wheel 71 and the purpose of which will be hereinafter explained. (See Figs. 1, 2, 18, 19 and 45.)

Secured to the top of the plate 60 is a bearing 95 in the center of which is a shaft 96 to the outer end of which is secured a gear 97, alongside of this gear is secured a smaller gear 98 which meshes with gears 99 and 100 secured to shafts 101 and 102 also rotating in the bearing 95 and which have the right and left hand square threads 103 and 104. These threads engage the racks 105 and 106 of the bars 107 and 108 which are caused to slide in opposite directions and toward and from one another by means of the angular slots 109. The bars are also pivoted to the two halves of a contracting and expanding box 110 by means of the screws 111, the boxes 110 are guided by the slots 112 and held in place by screws having large flat heads and the purpose of which will be hereinafter explained. (See Figs. 28, 29, 30, 34, 35 and 36.)

When the drum 59 rotates it naturally carries with it the gear 97 and the teeth of which mesh with a curved rack 113 having teeth pointing toward its center and which is secured to a suitable bracket 114 secured to frame 1. (Figs. 1, 2 and 32.) The continued movement of the said drum carries this gear around till it meshes with another curved rack 115 having teeth pointing away from its center and which is secured to a suitable bracket 116 secured to frame 1 and the purpose of which will be hereinafter explained. (See Figs. 1, 2 and 33.)

117 designates a flat circular guard plate extending partly around the outside of the drum 59 and is secured at its upper end by the angle iron 118 secured to frames 1 and 2 and at its lower end by the brackets 119 secured to the angle iron 120 secured to the frames 1 and 2.

Also meshing with the gear 57 is the gear 121 secured to the shaft 122 journaled in the frames 1 and 2. Also secured to shaft 122 is the bottom drum 123 having the extending arms 124 in which is journaled the shaft 125 to which is secured the cam 126 having extending arms 127 which strike a pin 128 secured in the end of a bracket 129 secured to the frame 1, and which turns or rotates the cam 126 and permits the spring 133 to contract the arms 130 and clamp or hold the box of matches. 130 designates arms pivoted to the sides of the drum 123 and to the top of which is secured an angle iron 131 and to the top of the angle iron is secured the split boxes 132 which consists of two halves having interlocking sections and which are drawn together by spring 133. (See Figs. 37, 39, 40, 41 and 42.) 134 designates the other arm of the cam 126 and which on the rotation of the drum 123 strikes the pin 135 extending out from the bracket 136 secured to the frame 1, and which turns or rotates the cam 126 and expands the arms 130 thus permitting the box of matches to fall on the belt 141.

137 designates a circular guard plate extending partly around the circumference of the drum 123 and is supported near its upper end by the angle iron 138 secured to frames 1 and 2 and at its lower end by the bracket 139 secured to the plate 140 secured to frames 1 and 2.

141 designates a belt running horizontally beneath the drum 123 and which passes around the pulley 142 secured to shaft 143 journaled in frames 1 and 2, it also passes around pulley 144 secured to shaft 145 journaled in the frames 1 and 2. Also secured to the shaft 145 is a pulley 146 around which passes a belt 147 also passing around a pulley 148 secured to shaft 91 which is driven by the gears 90, 89 and the belt wheel 88.

149 designates the ejector and 150 the box placed over the head end of the maches and 151 the other half forming a complete box for the matches.

Figure 12:
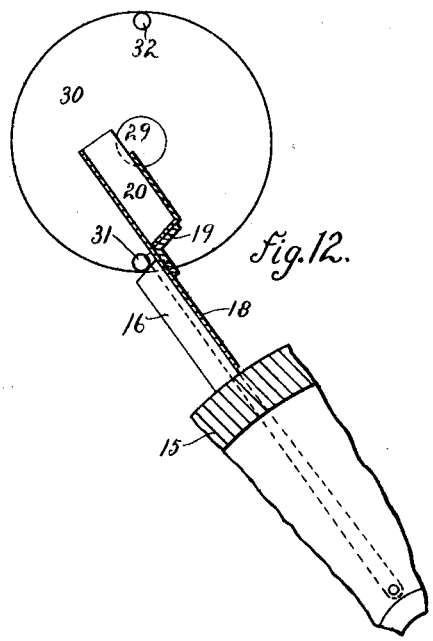
Figure 13:
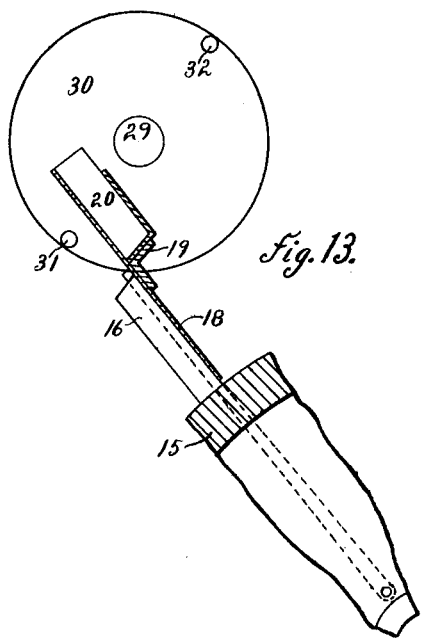
Figure 14:
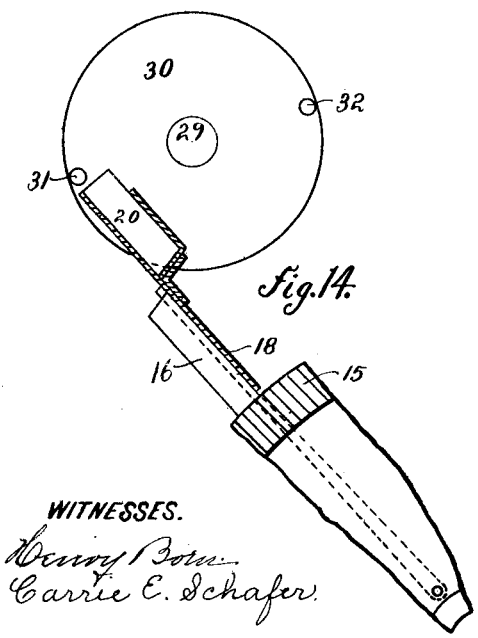

The mode of operation is as follows: An intermittent motion being imparted to the shaft 3, which by means of the bevel gears 4 and 5, shaft 6 and sprockets 7 and 8 move the carrier composed of the plates 9 carrying the matches 10 to the left. The plates are caused to slide in a suitable guideway 11 which is placed at an angle from the horizontal with the left hand end of the guideway at the lower level. (See Fig. 1.) The drum 15 is situated underneath the sprockets 7 and 8 and its shaft 14 is about 15 degrees to the right of the shaft 6 of the aforesaid sprockets 7 and 8. Needles of the ejector 149 reciprocate directly on a line between the center of the shafts 6 and 14 and eject the matches from the plates 9 and into the pivoted boxes 20. Referring to Fig. 3 it will be seen that the pivoted box 20 and the matches 10 occupy the same angular direction (i. e. 15 degrees) when they are in a straight line between shafts 6 and 14 and it is apparent that the momentum of the ejected match will be acted upon by gravity which will cause the head of the match to fall into the pivoted box 20 and just touch the side 18, the head of the match is also heaviest and this has a tendency to keep that end of the match down and as the match falls not more than its length it will not scatter, the angle at which it is caused to fall being such that the upper end would have a tendency to fall to the left but as the match touches the side 18 the friction naturally keeps it straight. (See Figs. 3 to 9 inclusive.) The plates 9 are caused to move one half inch at each ejection (which is the distance center to center of each row of matches) the diameter of the drum is such that the distance between the end of the plate 18 and the next adjoining one at the periphery is such that it is exactly 2 and $\frac{1}{2}$ inches or equal to five rows of matches as it is desired to eject five rows of matches into each box. This makes thirty five matches in each box which is the number usually placed in the boxes of matches that are given away with tobacco, etc. The gears 12 and 13 cause the plates 9 and the drum 15 to move in unison, as has been heretofore stated it is desired to eject five rows of matches into the pivoted boxes 20 which is accomplished as follows. Referring to Fig. 4 it will be seen that the first row of matches is in position to be ejected and to the left of this is the retarding shaft 23 with the pins 25 and 24. Referring to Fig. 44 it will be seen that the shafts 23 and 29 are intergeared and that both revolve in the same direction, each shaft having ten feeds per revolution as will be explained hereinafter. The center of the shaft 23 is not on a line with the end of the plate 18 but a certain distance beyond so that only four out of the five feeds are active or in other words that four positions of the pin 25 out of the five retard the movement of the pivoted box 20 (that is during a one half revolution of the shaft 23, during the other half revolution the other pin becomes active) the first ejection takes place with the parts as seen in Fig. 4 when the needles of the ejector touch the matches and are in the act of forcing the matches out of the holes of the plate 9 when the shaft 23 turns one feed and the parts are now in the position shown in Fig. 5 which shows one match in the pivoted box 20 after which the drum 15 and the plates 9 are moved as can be seen by the space between the extending arm 16 and the pivoted arm 17, the original position of the vertical pivoted box 20 being shown by the dotted outline. The plate 18 being held against the pin 25 by the spring 21 as can be seen in Fig. 23. In Figs. 4 to 14 I have omitted the springs for clearness of illustration. The needles now eject the second row of matches and the shaft 23 has made its second feed and is now in the position shown in Fig. 6 which shows 2 matches in the pivoted box 20 after which the drum 15 and the plate 9 have moved as can be seen by the greater space between the extending arm 16 and the pivoted arm 17, the original position of the vertical pivoted box 20 being shown in dotted outline. The needles now eject the third row of matches and the shaft 23 has made its third feed and is now in the position shown in Fig. 7 which shows 3 matches in the box 20, after which the drum 15 and the plate 9 have moved as can be seen by the increased space between the extending arm 16 and the pivoted arm 17, the original position of the box 20 being shown in the dotted outline. The needles now eject the fourth row of matches and the shaft 23 has made its fourth feed and is now in the position as shown in Fig. 8 which shows 4 matches in the box 20 after which the drum 15 and the plate 9 have moved as can be seen by the greatly increased space between the extending arm 16 and the pivoted arm 17, the original position of the box 20 being shown in dotted outline. The needles now eject the fifth row of matches and the shaft 23 has made its fifth feed and is now in the position shown in Fig. 9 in which it is seen that five matches are now in the box 20 and that the plate 18 has slipped off of the pin 25 and is stopped by the pin 31 on the accelerating disk 30, the plate drops about $\frac{1}{16}$ inch before striking the pin 31. The drum 15 and the plate 9 are now caused to move as shown in Fig. 10 wherein it is seen that the parts are now as shown at the start in Fig. 5 and also as shown in Fig. 3. The disk 30 now moves one feed which brings the box 20 in the position shown against the pin 31 and is held against it by the spring 21 as has been hereinbefore mentioned. The drum now moves one feed to the position as shown in Fig. 11 and then the disk 30 moves again wherein it is seen that the space between the extending arm 16 and the pivoted arm 17 is decreasing, which is due to the larger circle in which the pin 31 moves, the shafts 23 and 29 being intergeared by means of the idler gear 27. The next feed of the drum 15 is shown in Fig. 12 and then the disk 30 moves again wherein it is seen that the plate 18 again touches the extending arm 16. The drum 15 moves to the position as shown in Fig. 13 and then the disk 30 moves, at the movement of the extending arm 16 as seen in Fig. 12 the pin 31 again stops the plate 18 for an instant but after the movement of the disk 30 as seen in Fig. 13 the pin 31 is again clear of the plate 18 and in Fig. 14 it is seen that the box 20 will now keep its position against the extending arm 16 unless acted upon by some other agent.

The four feeds of the shaft 23 permit a movement of about $\frac{1}{4}$ inch of the box 20 and the $\frac{1}{16}$ inch that they drop at the last movement of the shaft 20 makes a movement of $\frac{5}{16}$ inch which is sufficient to give room for the matches to drop into the boxes and also allow them to be made of a width to allow sufficient room for the retarding and accelerating movement. There need not be any definite distance that the accelerating disk allows the boxes 20 to move as this need be only such that the boxes 20 again lie against the extending arm 16.

The pins of the shaft 23 contact with the top of the plate 18 and the pins of the disk 30 with the extended part of the plate 18 as can be seen in Fig. 15. In the views Figs. 5, 6, 7, 8 and 9 the matches are shown as ejected in five rows but they do not drop in such regular rotation, the second and third rows fall on either side of the first and the fourth and fifth will fall next to these so that there will be two (or three) rows in each box. The boxes 20 with the matches 10 continue to rotate step by step and are kept from falling out of the boxes by the circular guard plate 50 which extends partly around the outside of the drum 15. (See Figs. 1, 3 and 17.) This circular plate also has a curved groove or pathway extending around its inside surface in line with each row of boxes 20 and which as the matches arrive near the end of the guard plate at the bottom of the drum 15 cause them to assume the position as shown in Fig. 16 and at the end of the plate is the recess 55 and through which the matches must fall. (See Figs. 16, 17 and 18.) Fig. 16 shows the matches just previous to falling through this recess and Fig. 18 after they have fallen through and are in the sectional boxes 110. It will be noted that the ends of the matches which rub on the guard plate do not have any ignition material on them. Therefore there is no danger of them igniting. Situated near the bottom of the drum 15 and the end of the guard plate are the shafts 46 and 40 having the pins 42 and 43 and 48 and 49 respectively, and which operate precisely like the shafts 23 and 29 of Figs. 14 to 17 inclusive as has been heretofore explained.

The object of having the retarding and accelerating wheels near the bottom of the drum 15 is that the entire box of matches is brought very quickly over the recess 55 so that they will drop out of the boxes 20 at one time into the sectional boxes 110.

Referring to Fig. 17 it will be seen that the box 20 has its quickest movement, due to the position of the pin 48, at this point.

The gearing and drive for the shafts 23, 29, 40 and 46 is seen in Fig. 44. The gear 26 has 20 teeth meshing with the idler 27 which meshes with the gear 29 also having 20 teeth, this meshes with the large idler 33 which is loosely mounted on the shaft 14 and is free to rotate thereon. (See Figs. 1 and 2.) This gear meshes with gear 34 in the teeth of which acts the dog 37 pivoted on the swinging end of the arm 36 pivoted on shaft 35 and oscillated by the rod 38 as has been hereinbefore explained. The gear 45 also has 20 teeth and meshes with the idler 44 meshing with gear 39 also having 20 teeth which meshes with the aforementioned large idler 33. It is plainly apparent that if the arm 36 be oscillated enough to cause the dog 37 to take in two teeth at one movement then this will cause the gears 26, 28, 39 and 45 to make one revolution in ten feeds thus operating the retarding and accelerating shafts as has been hereinbefore explained.

The operation of the second drum is as follows: Referring to Figs. 17 and 18 it will be seen that the matches have fallen from the top drum and are standing in the sectional boxes 110 of the middle drum. In Figs. 34 and 35 will be seen perspective views of the expanded and contracted forms of these boxes. In these figures it will be seen that the two diagonally opposite corners have tongues and grooves in which the tongue of one half of the box fits a corresponding groove of the other half of the box and that by sliding them at an angle of 45 degrees to and from one another they will become larger or smaller. These boxes have a suitable base in which are slots 112 running at an angle of 45 degrees and which guide the direction in which the boxes slide.

The actuating mechanism is shown in Figs. 28 and 29. At the left hand end of the plate 60 is the bearing 95 in the center of which is the shaft 96 to the outer end of which is secured the gear 97 and alongside of which is the gear 98 which meshes with the gears 99 and 100 secured to the shafts 101 and 102 in the center of which are the right and left hand square threads 103 and 104 which mesh in the racks 105 and 106 (see Fig. 31) of the bars 107 and 108, which are guided by the slots 109 which correspond with the slots 112 of the boxes 110, the bars 107 and 108 are pivoted to the boxes 110 by the screws 111, large flat head screws hold the bars 107 and 108 in place, similar screws being used for the boxes 110, the bars 107 and 108 resting on the raised square portion of the base of the boxes 110 so that the bars will clear the heads of the screws.

Referring to Fig. 1 it will be seen that the plates 60 are arranged around the circumference of the drum 59 and when the said drum rotates it carries with it the gear 97 which will mesh with the circular rack 113 and rotate the gear left handed sufficient to cause the screws 103 and 104 to move the bars 107 and 108 and contract the boxes so that a paper box or cover can be placed on the matches by the operator. (See Figs. 28, 29, 32, 34 and 35.) On the continued rotation of the drum 59 the gear 97 will mesh with the rack 115 (see Figs. 1 and 33) which reverses the rotation of the gear 97 and expands the box from the position shown in Fig. 29 to that in Fig. 28 and permits the matches with the cover to fall from drum 59 into the pockets 132 of the drum 123 as best seen in Fig. 37.

The plate 60 is given a rapid vibratory motion by the mechanism which is seen in Figs. 18, 19, 20 and 23. Referring to Fig. 18 it will be seen that the end of the eccentric rod 61 is pivoted to the under side of the plate 60 by the screw 62 and is vibrated by the eccentric 63 of the shaft 64 journaled in the bearings 65 which are screwed to the side of the drum 59. The shaft 64 has a small gear 66 which meshes with a larger gear 67 secured to the sliding shaft 68 which is also journaled in the bearing 65. A collar 76 is pinned to the shaft 68 and rotates therewith, on both sides of this collar is a friction washer 75 having an extension or end 74 which slides in the slot 73 of the bracket 72 and which is thus prevented from rotating. (See Figs. 21, 22, 24, 26 and 27.) Between the lower friction washer 75 and the bearing 65 is a cam 77 which, in the position shown in Fig. 21, raises or elevates the shaft 68. Referring to Fig. 20 it is seen that on the rotation of the drum 59 the arm 78[a] of the cam 77 is caused to come in contact with the pin 82 on the bracket 81 and which gives the cam one quarter turn as shown in Fig. 22 in which it is seen that the spring 79 pressing between the angle part 80 of the bracket 72 and the upper friction washer 75 causes the shaft 68 to move downward, this brings a bevel friction wheel 69, which is screwed to the end of the shaft 68, in contact with the oppositely rotating friction drive wheels 70 and 71. This causes the small bevel wheel to revolve rapidly and by the meshing of the larger gear 67 with the small gear 66 of the shaft 64 causes the latter to revolve at a greatly increased speed and which, by means of the eccentric and eccentric rod, causes a very rapid vibration of the plate 60. This plate carries the sectional boxes 110 and while the vibration takes place the gear 97 meshes with the rack 113 and rotates the shafts 101 and 102 and contracts the boxes 110 as has been explained, thus closing or pressing the matches into a small space to permit the operator to place the cover over the ignition end of the matches.

The rack 113 with which the gear 97 meshes has the face of the teeth wider than those of the gear to allow for the sliding of the teeth during the vibration so that the teeth will always be in mesh with those of the rack. It is for this reason that the gear 97 is larger than the gear 100.

As has been hereinbefore explained the drum 15 is divided into 24 sections and each section into 5 feeds thus making 120 feeds per revolution. The middle drum being geared with the top drum by means of the gears 56 and 57 (see Figs. 1 and 2) moves in unison with it. The shafts 14 and 58 of these two drums are in a vertical line and as soon as the matches have been deposited from the top drum into the boxes 110 of the middle drum, then at the second feed from the center the arm 78$^a$ of the cam 77 is caused to strike the pin 82 (see Fig. 20) which turns this cam one quarter revolution dropping the shaft 68 and allowing the friction wheel 69 to come in contact with the friction drive wheels 70 and 71 and vibrating the plate 60 as has been explained.

The rack 113 is so situated that at almost the same time that the vibration commences the gear 97 is meshing with the rack. The rapid vibration causes all the matches to arrange themselves parallel with one another and the contraction of the boxes brings the matches close and compact. This occurs very rapidly and as soon as the boxes 110 have been contracted as seen in Fig. 29 (the gear 97 has now passed the rack 113) the arm 78 of the cam 77 comes in contact with the pin 83 of the bracket 81 (Fig. 20) when the cam 77 again raises the shaft 68 and the vibration ceases.

Referring to Figs. 18 to 20 inclusive it is seen that the gear 67 on the shaft 68 has sufficient space between the bearings for the sliding movement and the face of the gear is wider than the face of the gear 66 so that the teeth of these gears are always in mesh. The plate 60 slides in a reversed T slot in one end of the drum and the other end is held in place by a suitable gib as shown in the upper right hand view of Fig. 20.

The cover or box 150 for the head end of the matches is placed on them by hand as soon as the vibration stops, or in the space between the end of the rack 113 and the top of the circular plate 117, which passes partly around the drum 59 (see Figs. 1 and 36) and prevents any boxes of matches from falling off of the drum.

The belt 141 is driven by the belt 147 passing around the pulley 146 on shaft 145 and which also passes around pulley 148 on shaft 91. (See Figs. 12 and 45.)

Having thus described my invention what I claim as new and desire to secure by Letters Patent is:

1. In a match box filling machine an endless carrier carrying matches moving in a suitable guideway situated at an angle from the horizontal, a rotating drum underneath said carrier and having boxes arranged around its periphery and an ejecting device to eject matches into said boxes.

2. In a match box filling machine, an endless carrier carrying matches moving in a suitable guideway situated at an angle from the horizontal, a rotating drum underneath said carrier and having pivoted boxes arranged around its periphery and an ejecting device to eject matches therein.

3. In a match box filling machine, an endless carrier carrying matches moving in a suitable guideway situated at an angle from the horizontal, a rotating drum situated underneath said carrier and having a fixed step by step rotation and having pivoted boxes arranged around its periphery and an ejecting device to eject matches into said boxes.

4. In a match box filling machine, an endless carrier carrying matches moving in a suitable guideway situated at an angle from the horizontal, a rotating drum situated underneath said carrier and having a fixed step by step rotation moving in unison with the endless carrier and having pivoted boxes arranged around its periphery and an ejecting device to eject matches into said boxes.

5. In a match box filling machine, an endless carrier carrying matches moving in a suitable guideway situated at an angle from the horizontal, a rotating drum situated underneath said carrier and having a fixed step by step rotation moving in unison with the endless carrier and having pivoted boxes arranged around its periphery and means for retarding the movement of the pivoted boxes during the ejection of the matches into said boxes.

6. In a match box filling machine, an endless carrier carrying matches moving in a suitable guideway situated at an angle from the horizontal, a rotating drum situated underneath said carrier and having a fixed step by step rotation moving in unison with the endless carrier and having pivoted boxes arranged around its periphery, means for retarding the movement of the pivoted boxes during the ejection of the matches into said boxes and means for accelerating the movement of the aforesaid pivoted boxes after the desired number of matches have been ejected therein.

7. In a match box filling machine, a drum having pockets receiving and holding matches which project radially therefrom, in combination with a similar drum receiving the matches from the drum first mentioned.

8. In a match box filling machine, a drum having plates arranged around its circumference on each of which is mounted an expanded sectional box adapted to receive matches in a vertical position and means for contracting the said sectional box so that a cover or box can be placed over the head ends of said matches.

9. In a match box filling machine, a drum having plates arranged around its circumference on each of which is mounted a sectional box having tongues and grooves interlocking with and sliding within one another permitting the box to be expanded or contracted.

10. In a match box filling machine, a drum having plates arranged around its circumference on each of which is mounted a sectional box having tongues and grooves interlocking with and sliding within one another and the bases of such sections having suitable slots running at an angle with the sides or ends thereof and guiding the boxes during the expansion and contraction thereof.

11. In a match box filling machine, a drum having plates arranged around its circumference and on each of which is mounted a bearing in the center of which is a shaft carrying a gear meshing with a gear on either side, said latter gears secured to shafts having right and left hand threads thereon meshing with angular racks on the surface of two bars underneath of said threads and sliding on said bearings, said bars pivoted to the base sections of a sectional expanding and contracting box.

12. In a match box filling machine, a drum having plates arranged around its circumference and on each of which is mounted a bearing in the center of which is a shaft carrying a gear meshing with a gear on either side, said latter gears secured to shafts having right and left hand threads thereon meshing with angular racks on the surface of two bars underneath of said threads, said bars having slots running at an angle to the sides thereof and guiding them during the longitudinal movement in contracting or expanding a sectional box and said sectional box having the bases of its sections respectively secured to said bars.

13. In a match box filling machine, a drum having plates arranged around its circumference and on each of which is mounted a bearing in the center of which is a shaft carrying a gear meshing with a gear on either side, said latter gears secured to shafts having right and left hand threads thereon meshing with angular racks on the surface of two bars underneath of said threads said bars having slots running at an angle to the sides thereof and corresponding with similar slots in the base of an expanding and contracting sectional box and guiding them during the movements thereof and said sectional box having the bases of its sections respectively secured to said bars.

14. In a match box filling machine, a drum having plates around its circumference and on each of which is mounted mechanism for contracting and expanding a sectional box, said mechanism being operated by a gear which, on the rotation of said drum, meshes with a circular rack rotating the gear in one direction and contracting the sectional box and again meshing with another circular rack reversing the rotation of said gear and expanding said sectional box.

15. In a match box filling machine, a drum having a plate carrying a match receiving box thereon to which is pivoted a connecting rod actuated by an eccentric on the end of a shaft on which is a gear meshing with a larger gear on a sliding shaft on the end of which is a bevel friction wheel adapted to contact with oppositely rotating friction drive wheels which rapidly vibrate said plate.

16. In a match box filling machine, a drum having guideways in which slides a bar carrying a match receiving box vibrated by an eccentric geared to a sliding shaft and means for raising and lowering a friction bevel wheel carried by said shaft in and out of contact with oppositely rotating friction drive wheels.

17. In a match box filling machine, a drum having guideways on its periphery in which slides a bar carrying a match receiving box and vibrated by an eccentric geared to a sliding shaft and a collar on said shaft having friction washers on either side having an end for extension sliding in a slot in a bracket to prevent same from rotating and means for rotating such shaft into and out of engagement with which said shaft is slid by means engaging one of said washers.

18. In a match box filling machine, a drum having guide ways on its periphery in which slides a bar carrying a match receiving box and vibrated by an eccentric geared to a sliding shaft, a collar on same having friction washers on either side, a bracket through which passes the upper end of the sliding shaft and a spring loosely mounted on same to increase the friction of a bevel wheel and means for rotating such shaft into and out of engagement with which said shaft is slid by means engaging one of said washers.

19. In a match box filling machine, a drum secured to a shaft having guideways on its periphery in which slides a bar carrying a match receiving box and vibrated by an eccentric geared to a sliding shaft, a friction drive wheel rotating on the drum shaft and another friction drive wheel rotating in the opposite direction on the hub of the first mentioned friction wheel and contacting on opposite points on the periphery of a friction bevel wheel carried by said sliding shaft and rapidly rotating same.

20. A match box filling machine, comprising a rotatable drum, means for rotating it step by step, pivoted boxes carried by the drum, mechanism for retarding the pivotal motion of said boxes causing the forward movement of said pivotal boxes to be approximately a parallel movement, mechanism for accelerating the pivotal motion of said boxes and means for intermittently rotating said mechanism.

21. A match box filling machine, comprising a rotatable drum, means for rotating it step by step, pivoted boxes carried by the drum having pockets receiving and holding matches which project radially therefrom, mechanism for retarding and accelerating the pivotal motion of said boxes and means for intermittently rotating said mechanism.

22. In a match box filling machine, a drum secured to a shaft having guideways on its periphery in which slides a bar carrying sectional boxes and means for simultaneously vibrating said bars and contracting and expanding the sectional boxes.

23. In a match box filling machine, a drum secured to a shaft, means for imparting a step by step rotation thereto, said drum having guideways on its periphery in which slides a bar carrying sectional boxes and means for simultaneously vibrating said bars and contracting and expanding the sectional boxes during the step by step rotation of said drum.

24. In a match box filling machine comprising a rotatable drum, means for rotating it step by step, split boxes carried by the drum, mechanism for opening and closing said boxes and means for operating said mechanism.

25. In a match box filling machine, a drum situated directly underneath of a middle drum and having split boxes arranged around its periphery and means for opening said boxes so as to receive a box of matches from the middle drum.

26. In a match box filling machine, a drum having pivoted split boxes arranged around its periphery, means for opening said boxes to receive a box of matches from a drum situated directly above it, a cam for opening said split boxes and a spring for bringing them together and clamping the said box of matches.

27. In a match box filling machine, a drum carrying split pivoted boxes, a shaft on the end of which is secured a cam and means for turning said cam in opposite directions for opening or closing said boxes which are adapted to receive a box full of matches.

28. A match box filling machine comprising a rotatable drum, means for rotating it step by step, pivoted boxes carried by the drum, mechanism for retarding and accelerating the pivotal motion of said boxes and means for intermittently rotating said mechanism.

29. A match box filling machine comprising rotatable drums, means for rotating said drums step by step, pivoted boxes carried by one of the drums, mechanism for retarding the pivotal motion of said boxes of one of the drums during the time that matches are inserted therein from a carrier, mechanism for accelerating the pivotal motion of said boxes of one of the drums and means for passing the matches from one drum into the expanded sectional boxes of a second drum.

30. In a match box filling machine, comprising a rotatable drum, means for rotating it step by step, pivoted boxes carried by the drum, radial arms and yielding means secured to the preceding arm for holding said boxes against said arms to permit the retarding of the pivoted boxes during the insertion of matches therein.

31. A match box filling machine comprising superimposed drums, means for rotating said drums step by step, pivoted boxes carried by one of the drums, mechanism for retarding and accelerating the pivotal motion of said boxes, mechanism carried by one of the drums for receiving matches from the first mentioned drum, mechanism for vibrating and expanding or contracting sectional boxes of the second drum, mechanism carried by another drum for receiving the matches from the first drum, mechanism for clamping or holding the matches in sectional boxes of the last drum and means for intermittently rotating the drums and passing the matches from one drum to another.

32. A match box filling machine comprising a rotatable drum, means for rotating it step by step, pivoted boxes carried by the drum having pockets receiving and holding matches which project radially therefrom, a guideway above the drums situated at an angle, an ejecting device for ejecting matches from the carrier into the pivoted boxes, mechanism for retarding the pivotal motion of said boxes at an angle corresponding with the angle at which the matches are ejected from the carrier.

33. In a match box filling machine comprising a rotatable drum, means for rotating it step by step, sectional boxes carried by the drum, mechanism for expanding or contracting said sectional boxes, and means for operating the expanding or contracting mechanism.

34. In a match box filling machine, comprising a rotatable drum, means for rotating it step by step, sectional boxes carried by the drum mounted upon plates, mechanism for expanding or contracting the sectional boxes, guideways on the drums for the plates, and means for vibrating said sectional boxes.

35. In a match box filling machine comprising a rotatable drum, means for rotating it step by step, sectional boxes carried by the drum mounted upon plates, bars pivoted to said sectional boxes and means for simultaneously moving said bars in opposite directions.

36. In a match box filling machine comprising a rotatable drum, means for rotating it step by step, sectional boxes carried by the drum mounted by the plates, bars pivoted to said sectional boxes and means for simultaneously moving said bars away from or toward one another.

37. In a match box filling machine comprising a plurality of rotatable drums, means for rotating them step by step, pivotal, sectional and split boxes carried by said drums and means for passing matches radially from one drum to another.

FRANK SCHAFER.

Witnesses:
HENRY BOEN,
CARRIE E. SCHAFER.

---

Copies of this patent may be obtained for five cents each, by addressing the "Commissioner of Patents, Washington, D. C."